US012697774B2

(12) United States Patent (10) Patent No.: US 12,697,774 B2

Ferris Roig et al. (45) Date of Patent: Aug. 4, 2026

(54) ADDITIVE MANUFACTURING SYSTEMS

(71) Applicant: Peridot Print LLC, Palo Alto, CA (US)

(72) Inventors: Cristian Ferris Roig, Sant Cugat del Valles (ES); Marius Valles Gonzalez, Sant Cugat del Valles (ES); Gerard Mosquera Donate, Sant Cugart del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 464 days.

(21) Appl. No.: 17/294,679

(22) PCT Filed: Apr. 30, 2019

(86) PCT No.: PCT/US2019/029838

§ 371 (c)(1),
(2) Date: May 17, 2021

(87) PCT Pub. No.: WO2020/222787

PCT Pub. Date: Oct. 5, 2020

(65) Prior Publication Data

US 2021/0394443 A1 Dec. 23, 2021

(51) Int. Cl.
| | |
|---|---|
| *B29C 64/295* | (2017.01) |
| *B29C 64/25* | (2017.01) |
| *B29C 64/386* | (2017.01) |
| *B33Y 30/00* | (2015.01) |
| *B33Y 50/00* | (2015.01) |
| *B29K 101/12* | (2006.01) |

(52) U.S. Cl.
CPC ............ *B29C 64/295* (2017.08); *B29C 64/25* (2017.08); *B29C 64/386* (2017.08); *B33Y 30/00* (2014.12); *B33Y 50/00* (2014.12); *B29K 2101/12* (2013.01)

(58) Field of Classification Search
CPC ..... B29C 64/295; B29C 64/386; B29C 64/25; B29K 2101/12
See application file for complete search history.

(56) References Cited

U.S. PATENT DOCUMENTS

| | | | |
|---|---|---|---|
| 9,656,427 B2 | 5/2017 | Griszbacher | |
| 2010/0101490 A1* | 4/2010 | Bokodi | B33Y 40/00 |
| | | | 118/500 |

(Continued)

FOREIGN PATENT DOCUMENTS

| | | |
|---|---|---|
| CN | 103056364 A | 4/2013 |
| CN | 204149546 U | 2/2015 |

(Continued)

*Primary Examiner* — JaMel M Nelson
*Assistant Examiner* — Erica Hartsell Funk
(74) *Attorney, Agent, or Firm* — Michael Dryja

(57) ABSTRACT

Example implementations provide an additive manufacturing system for manufacturing a 3D object from a build material; the system comprising a build chamber having a build platform for supporting a build material bed; the build chamber having a number of walls, at least one wall of the plurality of walls bearing, or being associated with, two or more thermal elements, responsive to respective control signals, to influence the temperature of the build chamber; the two or more thermal elements being disposed in a direction of an axis of movement of the build platform.

20 Claims, 9 Drawing Sheets

100

(56)            References Cited

U.S. PATENT DOCUMENTS

| | | |
|---|---|---|
| 2013/0101728 A1 | 4/2013 | Keremes et al. |
| 2013/0329243 A1 | 12/2013 | Letertre et al. |
| 2014/0314613 A1* | 10/2014 | Hopkinson ........... B22F 10/362 |
| | | 264/460 |
| 2015/0190966 A1 | 7/2015 | Griszbacher et al. |
| 2016/0221262 A1 | 8/2016 | Das et al. |
| 2017/0106595 A1 | 4/2017 | Günther et al. |
| 2018/0200790 A1 | 7/2018 | Hart et al. |
| 2018/0229301 A1* | 8/2018 | De Pena ................. B22F 10/00 |

FOREIGN PATENT DOCUMENTS

| | | |
|---|---|---|
| CN | 204955421 U | 1/2016 |
| CN | 205767519 U | 12/2016 |
| CN | 106623919 A | 5/2017 |
| CN | 106794631 A | 5/2017 |
| CN | 208164310 U | 11/2018 |
| EP | 3395481 A1 | 10/2018 |
| WO | WO-2017184002 | 10/2017 |
| WO | WO-2018140034 | 8/2018 |
| WO | 2019/058421 A1 | 3/2019 |
| WO | WO-2019/078870 | 4/2019 |

\* cited by examiner

100

200

400

300

600

700

800

<u>1000</u>

ADDITIVE MANUFACTURING SYSTEMS

BACKGROUND

Additive manufacturing is transforming classical part manufacturing processes, including removing many current limitations, leading to more complex geometries using a simpler manufacturing process.

The quality of an additively manufactured product can be influenced positively or negatively by prevailing environmental conditions within an additive manufacturing system used to produce the product.

BRIEF DESCRIPTION OF THE DRAWINGS

Example implementations will now be described, by way of example, with reference to the accompanying drawings in which.

DETAILED DESCRIPTION

Figure 1:
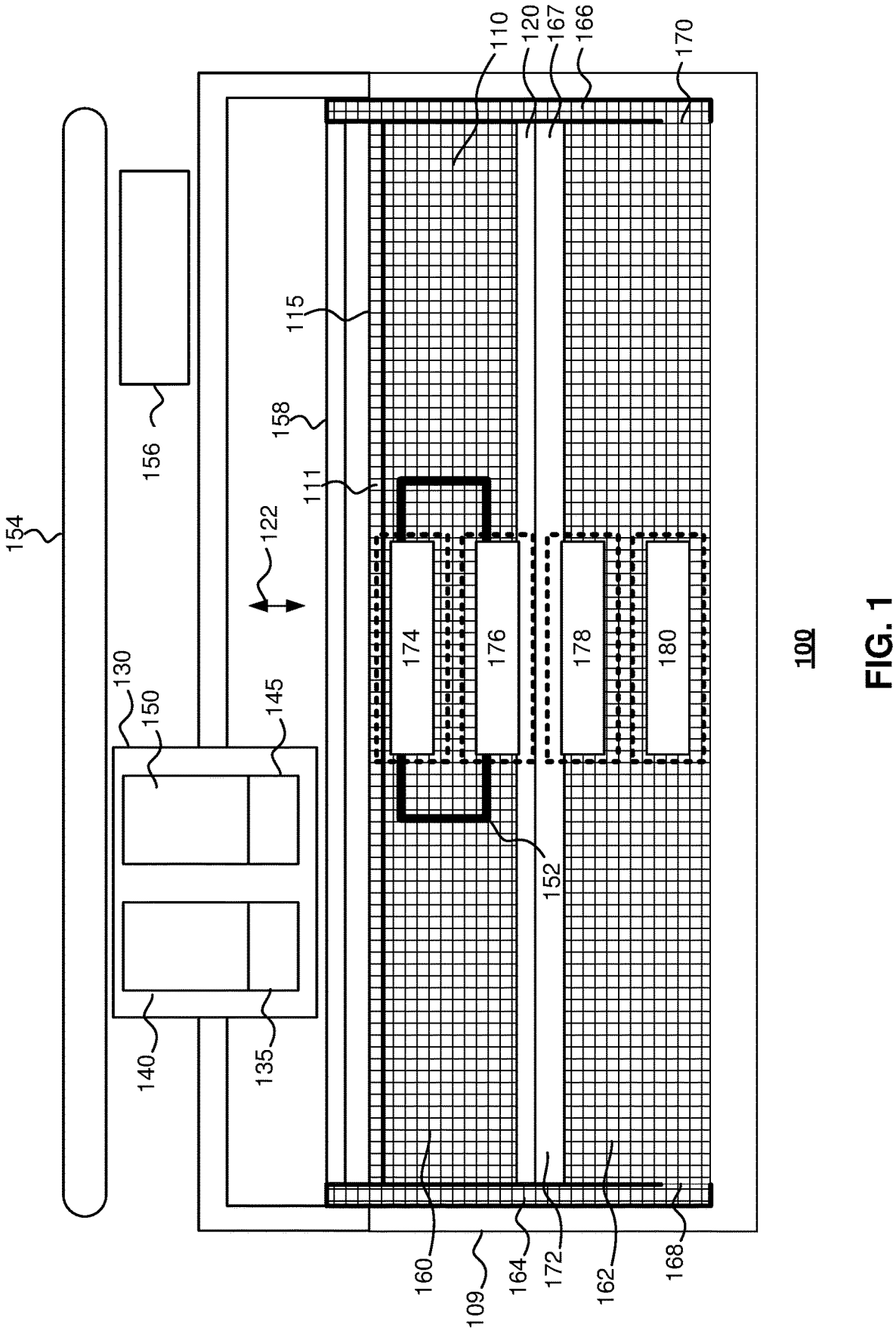
FIG. 1 is a schematic view of a 3-dimensional (3D) printing system according to example implementations.

FIG. 1 shows an example of a sectional view of a 3D printing system 100. The system 100 may include a removable build unit 109 comprising a build chamber 110 within which layers of build material 111 can be accumulated to form a build material bed 115. The build unit 109 can alternatively form a fixed part of the system 100 as opposed to being removable. The build material 111 can be, for example, a powder. In the example shown, the build chamber 110 has a build platform 120. The build platform is provided to bear layers, or a volume, of build material to be selectively solidified to form each layer of a 3D object or part to be printed, that is, the build platform supports the build material bed. The 3D printing system 100 is an example implementation of an additive manufacturing system for manufacturing a 3D object from a build material. The build platform 120 is reciprocally movable in both directions of an axis 122.

Examples of one or more build materials can comprise at least one of a polymer powder, or other plastic powder, a metal powder, a ceramic powder or other powder-like material, or lengths or units of such build material, taken jointly and severally in any and all permutations. The lengths or units of build material can comprise fibres, filaments or threads of build material. The fibres, filaments or threads of build material can be formed from, or otherwise derived from, longer or larger units of build material. The build material can be responsive to heat, or a binding agent, to fuse, or bind, adjacent particles of build material. For example, the build material to be fused can be defined with a printing liquid. The printing liquid can be arranged to couple heat to the build material to cause adjacent build material to fuse together. Additionally, or alternatively, the printing liquid may cause or influence chemical binding of the build material. Furthermore, the chemically bound build material can be subjected to heat to fuse the chemically bound build material together. For example, build material can comprise polypropylene, polyester, polyamide such as, for example, PA11, PA12, polylactic acid, thermoplastic polyurethane (TPU) or the like.

The system 100 can also comprise a printhead carriage 130 that has one or more than one inkjet pen for printing liquids. For example, the system 100 can provide a first inkjet pen 135 in communication with a first reservoir 140 of a first printing liquid. Example implementations can be realised in which the printing liquid is an energy absorbing fusing agent. The system can also provide a second inkjet pen 145. The second inkjet pen 145 can be in communication with a second reservoir 150 of a second printing liquid. Example implementations can be realised in which the second printing liquid can be a detailing agent.

At least one, or both, of the first and second inkjet pens 135 and 145 can be used to influence use of the build material to construct a 3D printed object 152. For example, the fusing agent printed via the pen 135 can define the build material to be fused.

After the fusing agent has been printed onto a layer of build material, a heater such as, for example, a fusing lamp 154, can be used to heat the build material. Build material bearing fusing agent absorbs more energy than build material without fusing agent such the former agglomerates whereas the latter does not fuse. The fusing lamp 154 is an example implementation of a heat source.

The detailing agent can be used to improve the definition between fused and unfused portions of build material during heating. The detailing agent is printed onto build material intended to remain unfused that is adjacent to build material intended to be fused. The detailing agent influences the temperature of the build material onto which it is printed to inhibit fusing of that build material. The detailing agent can constrain thermal bleed, that is, it can constrain the inadvertent spread of heat to build material intended to remain unfused.

To achieve good selectivity between the fused and unfused portions of a build material layer, the fusing agent can absorb enough energy to increase the temperature of any build material coated or printed with the fusing agent above the melting or softening point of the build material, while unprinted portions of the layer of build material remain below the melting or softening point.

A controller 156 controls the operation of the 3D printer 100. The controller 156 can comprise one or more than one processor for executing machine-readable or machine-executable instructions for realizing any and all examples herein. Accordingly, examples provide at least one or more than one of circuitry, hardware or software, taken jointly and severally in any and all permutations, for implementing such a controller 156 to implement or execute any such instructions. The controller 156 is arranged to implement any control and/or any methods described herein.

The build material 111 is deposited via a recoater 158. The recoater 158 is arranged to deposit a layer of build material, such as layer 111, during a traversal of the build platform 120. Layer 111 is an example of such a layer of build material. The recoater 158 moves in a reciprocating manner depositing build material in a direction normal to the plane of FIG. 1.

The build chamber 110 is divided into two portions by the build platform 120; namely, an upper portion or chamber 160 and a lower portion or chamber 162. As the 3D product 152 is progressively printed, the build platform 120 descends through the build chamber in a direction of the axis 122. Fresh unfused supply build material is stored in the lower portion 162 of the build chamber 110 and is transported to the recoater 158 via a pair of channels 164 and 166. The lower portion 162 containing the unfused supply build material can be initialized or filled to a predetermined level 167. The unfused supply build material enters the channels 164 and 166 via respective apertures 168 and 170. At least one, or both, of the predetermined level 167 or rate of use of build material can be such as a gap or volume 172 exists beneath the build platform 120.

Also shown in FIG. 1 is a plurality of thermal elements 174 to 180. The thermal elements 174 to 180 have respective regions of influence, depicted by the dashed lines surrounding the thermal elements 174 to 180. The thermal elements 174 to 180 are arranged to influence the temperature of at least one, or both, of the unfused or fused build material within the upper portion 160 of the build chamber 110. Four such thermal elements 174 to 180 have been depicted and the thermal elements are shown as influencing the temperature of just a selected portion of the fused and unfused build material above the build platform 120 to preserve the clarity of the figure for explanation purposes. Example implementations can be realised in which any given wall of the build chamber 115 comprises multiple thermal elements disposed in the direction of the axis 122 of a direction of movement of the build platform. Furthermore, example implementations can be, additionally or alternatively, realised in which any given wall of the build chamber 115 comprises multiple thermal elements disposed in one or more than one direction orthogonal to the axis 122. The thermal elements 174 to 180 are described in more detail with reference to FIG. 2. Any or all example implementations described herein can provide for the axis 122 being vertical such that at least two or more of the thermal elements are vertically disposed relative to one another.

Figure 2:
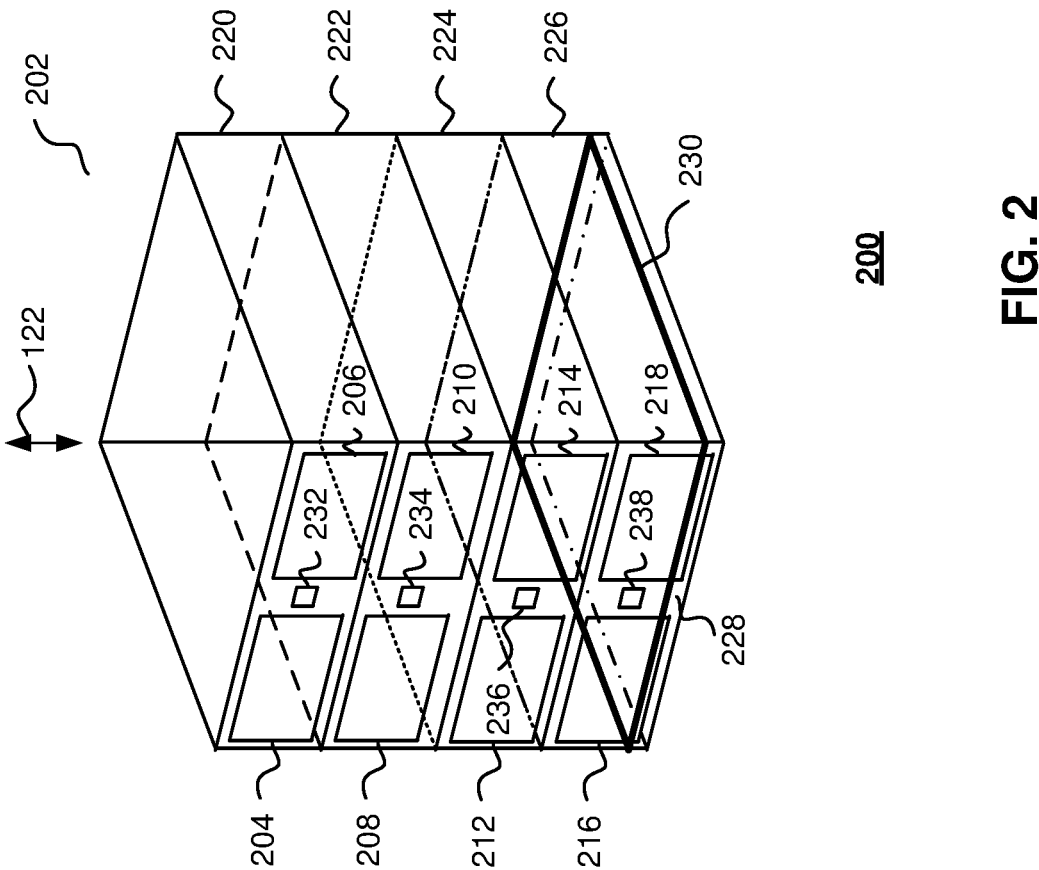
FIG. 2 illustrates a schematic view of a build chamber according to example implementations.

Referring to FIG. 2, there is shown a view 200 of a build chamber 202 comprising thermal elements 204 to 218 according to example implementations. The thermal elements 204 to 218 can be example implementations of the above-described thermal elements 174 to 180. The build chamber 202 is an example of the build chamber 110. The thermal elements can be heaters arranged to influence the temperature of the build chamber 202. The thermal elements 204 to 218 are arranged in groups or sets. A group or set of thermal elements is arranged to influence the temperature of a respective zone or volume of the build chamber. Such a respective zone or volume is an example of the above-described regions of influence depicted by the dashed lines surrounding the thermal elements 174 to 180. In the example implementation the build chamber 202 is arranged into at least four zones or volumes. Each zone or region is shown as being influenced by a pair of thermal elements. For example, a first zone or volume 220 is associated with a first pair of thermal elements 204 to 206, a second zone or volume 222 is associated with a second pair of thermal elements 208 to 210, a third zone or volume 224 is associated with a third pair of thermal elements 212 to 214 and a fourth zone or volume 226 associated with a fourth pair of thermal elements 216 to 218. Such zones or volumes are example implementations of one or more respective region of the build chamber.

Although the example implementation has been shown as having thermal elements disposed on the front wall 228 of the build chamber 202, example implementations can be realised in which the thermal elements are disposed on other walls of the build chamber, in addition, or as alternatives, to being disposed on the front wall 228. Example implementations can be realised in which the build chamber has a number of walls. Two or more than two thermal elements can be disposed on one or more than one wall of the number of walls. Two or more than two thermal elements can disposed on a set of walls of the number of walls. The set of walls can comprise any number of the walls. Example implementations can be realised in which the set of walls comprises at least a single wall, at least a pair of walls, at least three walls, at least four walls, all walls or some other number of walls according to the number of walls of the build chamber 202. Example implementations can be realised in which at least one, or both, of the distribution or operation of the one or more than one thermal element is arranged to provide at least one, or both, of a predetermined thermal environment or a uniform thermal environment within at least one or more than one predetermined zone or volume of the build chamber 202, or within a sub-zone or sub-volume of the at least one or more than one predetermined zone or volume. By operating the thermal elements selectively, according to where temperature control is needed, that is, within the volume containing the fused build material, example implementations can be realised in which part of a zone or volume is thermally managed as opposed to the whole of such a zone or volume, which can save energy, which can have the benefit that unfused build material within the upper portion or chamber 160 of the build material can be protected from temperatures that would adversely affect such unfused build material.

Therefore, example implementations can be realised in which any one or more than one, or a selected sub-set, or all, of the zones or volumes can have one or more than one thermal element. Example implementations can be realised in which any one or more than one, or a selected sub-set, or all, of the zones or volumes can have a plurality of thermal elements.

The example implementation depicted in FIG. 2 comprises a predetermined number of zones or volumes 220 to 226. In the example shown, four such zones or volumes are provided. Example implementations are not limited to such a predetermined number of zones or volumes. Implementations can provide some other number of zones or volumes according to a target or desired resolution or granularity of control over the temperature within the build chamber. Increasing the number of zones or volumes will provide a finer resolution of control whereas decreasing the number of zones or volumes will provide a coarser resolution of control. At least in part, the number of zones or volumes in a given implementation is related to the number of levels thermal elements in the direction of the axis 122, that is, a direction normal to the plane of the build platform, or to at least one, or both, of the size and distribution of the thermal elements. Additionally, example implementations can be realised in one or more than one thermal element is provided transversely, that is, in direction parallel to the plane of the build platform, which is orthogonal to the axis 122.

Also shown in FIG. 2 is a build platform 230. It can be appreciated that the build platform 230 has been shown as being in the fourth zone 226. The build platform is an example of the build platform 120.

As the build platform 230 progressively descends within the build chamber 202 due to the layer-by-layer construction of a 3D printed object such as object 152 shown in FIG. 1, the build chamber will progressively fill with a combination of unfused build material and fused build material; the latter being the 3D printed object under construction. As a zone or region such as the above zones or regions 220 to 226 contain fused or unfused build material, corresponding thermal elements within one or more than one zone or volume containing such build material will be controlled or otherwise operated to influence the temperature of such build material.

Influencing or otherwise controlling the temperature of the build material within a zone or volume provides control over a predetermined characteristic of the 3D object under construction. The predetermined characteristic can comprise at least the rate of cooling of the 3D printed object. Therefore, as the build platform 120 bearing the 3D object under construction enters a zone or volume, the respective one or more than one thermal element is controlled to influence the predetermined characteristic of the 3D object under construction. Consequently, each set of thermal elements maintains a respective zone or volume of fused build material under a predetermined environmental condition or state such as, for example, a predetermined temperature.

Example implementations can be realised in which the thermal elements are controlled in a closed-loop or feedback manner. Suitably, one or more than one sensor can be provided to monitor a predetermined characteristic of the build chamber 110. The predetermined characteristic of the build chamber can be the temperature within the build chamber. The one or more than one sensor can, therefore, comprise a temperature sensor. In the example depicted in FIG. 2, a number of sensors 232 to 238 are shown. Each zone or volume 220 to 228 shown has at least one respective sensor 232 to 238. Example implementations can be provided in which one or more than one zone or volume can comprise more than one sensor.

The thermal elements 204 to 218 and sensors 232 to 238 as shown on the front wall 228 of the build chamber 202 can also be provided on any one or more than one wall of the build chamber 202. The thermal elements 204 to 218 and sensors 232 to 238 provided on such other wall or walls can have the same spatial distribution, or can have a different spatial distribution, as the thermal elements 204 to 218 and sensors 232 to 238 on the front wall 228.

The thermal elements 204 to 218 can be realised using planar thermal elements such as, for example, silicone rubber heaters or mica ceramic heaters.

Figure 3:
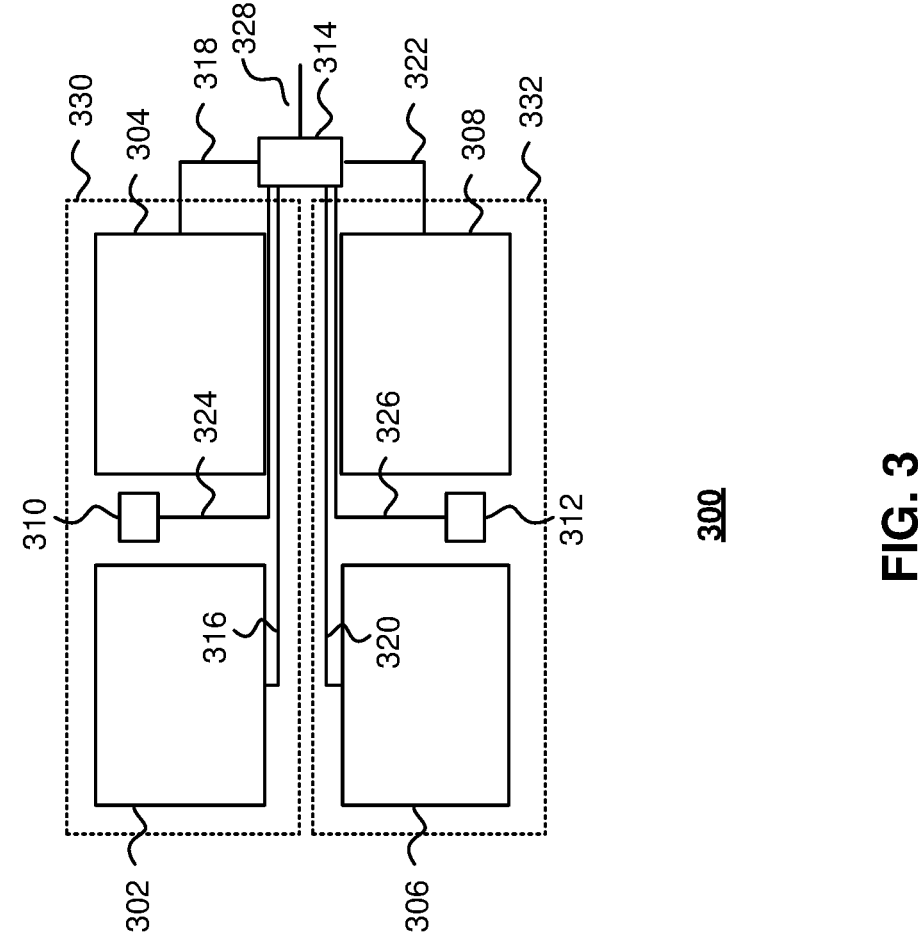
FIG. 3 depicts a number of thermal elements and control electronics according to example implementations.

Referring to FIG. 3, there is shown a view 300 of an arrangement of a plurality of thermal elements 302 to 308 and respective sensors 310 and 312. The thermal elements and sensors can be examples of any of the above described thermal elements 204 to 218 and sensors 232 to 238. At least one, or both, of the thermal elements 302 to 308 or sensors 310 to 312 are operable in response to a controller 314. The controller 314 can be a processor or other control device, such as, for example, a microcontroller. Although the controller 314 has been schematically shown as being relatively proximal to the thermal elements 302 to 308, example implementations can be realised in which the controller is disposed relatively distal to the thermal elements 302 to 308. For example, the controller 314 could be positioned so that it is not adversely affected by the thermal elements when operating.

Furthermore, the controller 314 has been depicted as controlling a predetermined number of thermal elements 302 to 308. In the example shown, the predetermined number of thermal elements 302 to 308 comprises four thermal elements. However, implementations are not limited to such a predetermined number of thermal elements 302 to 308. Example implementations can be realised in which the controller 314 controls some other number or set of thermal elements. The other number or set of thermal elements can comprise one or more than one thermal element associated with a respective zone or volume, a subset of all thermal elements associated with a respective zone or volume or all thermal elements associated with a respective zone or volume.

The controller 314 is arranged to output control signals to or to receive signals from at least one, or both, of one or more than one of the thermal elements 302 to 208 or one or more than one of the sensors 310 to 312 via respective control lines 316 to 322 for the thermal elements and control lines 324 and 326 for the sensors. The controller 314 can also comprise a communication line or bus 328 for communicating with a further controller (not shown). The further controller can, for example, control or otherwise orchestrate the operation of at least thermal elements and sensors of the build chamber as a whole, or control or orchestrate the operation of, or at least part of the operation of, the 3D printer 100 as a whole. The controller 156 can be an example of such a further controller.

The controller 314 can activate or otherwise operate the thermal elements 302 to 308 either individually, that is, separately or jointly with one or more than one other thermal element of the thermal elements. Therefore, for example, as the build platform 120 or 230 descends, a first set 330 of the thermal elements 302 to 304 can be activated first to influence the temperature within a respective zone or volume, until the build platform 120 or 230 descends into a subsequent zone or volume associated with a second set 332 of thermal elements 306 to 308 whereupon the thermal elements 306 to 308 within that second set 332 are activated to influence the temperature within a respective zone or volume. The two sets 330 and 332 could form, for example, the thermals elements for controlling the temperature of any two adjacent zones or volumes of the above-described zones or volumes 220 to 226.

Figure 4:
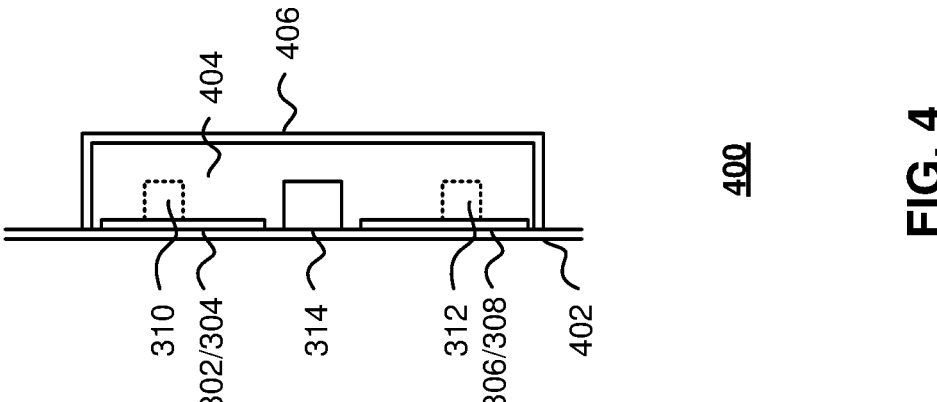
FIG. 4 shows a sectional view of the thermal elements and control electronics of FIG. 3.

Referring to FIG. 4, there is shown a view 400 of the arrangement of thermal elements 302 to 308 and sensors 310 to 312 mounted to a wall 402 of the build chamber 202. At least one, or both, of the thermal sensors 302 to 308 and sensors 310 to 312, are embedded in, or shielded by, a respective layer of insulation 404. The respective layer of insulation 404 can be held in place by a housing 406.

Figure 5:
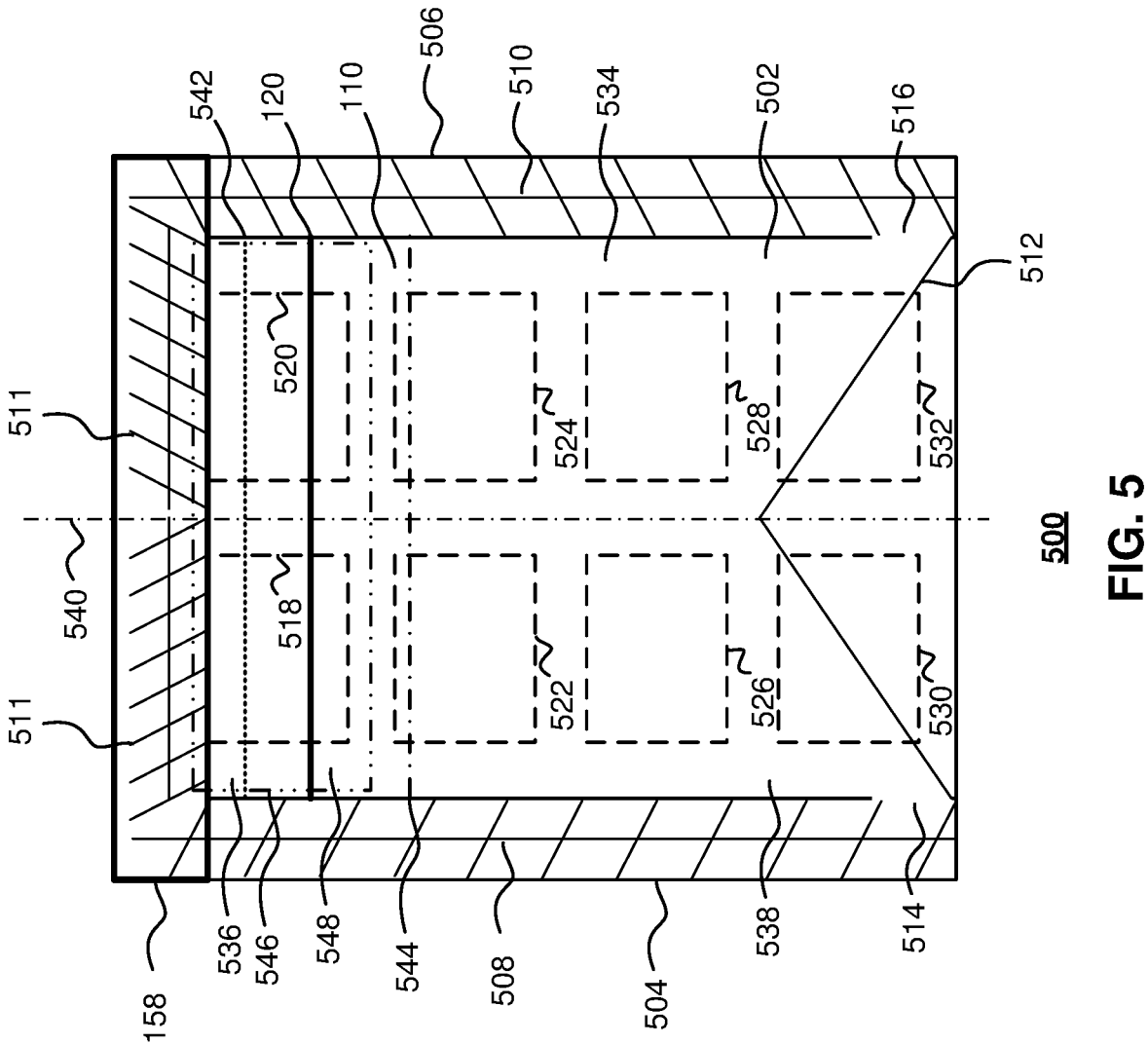
FIG. 5 shows a schematic view of the build chamber according to example implementations.

Referring to FIG. 5, there is shown a view 500 of a portion of the printer 100 showing the build chamber 110 and the build platform 120 or 230. Also shown is the recoater 158. The recoater 158 is fed with unfused build material 502 that is stored within the build chamber 110 below the build platform 120. The unfused build material 502 is routed to the recoater 158 via at least one channel. The unfused build material 502 is an example of the above-described unfused supply build material. The example implementation shown uses at least two channels 504 and 506. The channels 504 and 506 can be examples of the above-described channels 164 and 166. The at least one channel is arranged to transport the unfused build material 502 from the build chamber 110 to the recoater 158 using at least one transport mechanism. In the example implementation shown, the at least one transport mechanism comprises a pair of Archimedes screws 508 and 510 operable to feed the recoater 158 with unfused supply build material for subsequent distribution and use in constructing the 3D object 152. The recoater 158 can also contain at least one transport mechanism for distributing the unfused supply build material throughout or across the recoater 158 for subsequent depositing as a layer of build material. The at least one transport mechanism of the recoater 158 can comprise a pair of Archimedes screws 511.

The build chamber 110 can comprise a guide 512 that is arranged to direct unfused supply build material towards at least one aperture that feds the at least one channel. In the example implementation shown, the guide 512 is arranged to direct unfused supply build material to at least a pair of apertures 514 and 516 that feed respective channels 504 and 506 of the at least two channels. The apertures 514 and 516 are examples of the above-described apertures 168 and 170. The channels 504 and 506 are examples of the above-described channels 164 and 166.

Also shown in FIG. 5 is a number of thermal elements 518 to 532 embedded in, or associated with, a far wall 534 of the build chamber 110, which are shown using dashed lines. The thermal elements 518 to 532 are example implementations of any of the thermal elements described herein. Not shown are associated sensors or corresponding controllers for the thermal elements 518 to 532.

As described above, the build platform 120 divides the build chamber 110 into an upper chamber or portion 536 and a lower chamber or portion 538. The upper 536 and lower 538 portions are examples of the above described upper 160 and lower 162 portions. The upper chamber 536 is used to house the layers of fused build material as the 3D product is constructed, that is, it is used to house the fused and unfused build material resulting from multiple depositions of build material. The fused and unfused build material contained within the upper chamber 536 is known as the cake. The lower chamber 538, as previously indicated, contains the unfused supply build material 502.

The build platform 120 can move in a reciprocating manner along an axis 540. The build platform 120 descends progressively downwards in the direction defined by the axis 540 as the 3D product is produced layer-by-layer. The axis 540 is an example of the above-described axis 122.

Although the thermal elements are shown as being embedded in, or otherwise associated with, the far or rear wall 534, example implementations are not limited to such as arrangement. Example implementations can be realised in which two, three, four or more walls of the build chamber 110 bear such thermal elements 518 to 532. Example implementations can be realised in which the build chamber 110 comprises four walls that bear such respective thermal elements 518 to 532.

Also shown in FIG. 5 is a threshold marker 542 that schematically depicts the depth to which heat from the printer 100 such as, for example the heater or lamp 154 maintains the cake above a predetermined temperature.

FIG. 5 also depicts an unfused supply build material threshold or level 544 reflecting a current fill-level of the unfused supply build material within the lower portion 538 of the build chamber. The level 544 is an example of the above described predetermined level 167. The thermal elements 518 and 520 are depicted as having a respective zone or volume of influence 546. The zone or volume of influence 546 can be an example implementation of the above-described zones or volumes 220 to 226. The zone or volume of influence 546 does not extend to the current fill-level of the unfused supply build material 502. However, example implementations can be realised in which the zone or volume of influence 546 does, at least initially, extend to the current fill-level of the unfused supply build material 502. As the unfused supply build material is progressively used, the gap or volume 548 immediately beneath the build platform 120 is at least maintained or increases. The variation in the gap or volume 548 beneath the build platform 120 can arise due to a difference in density between unfused supply build material 502 and fused build material.

Figure 6:
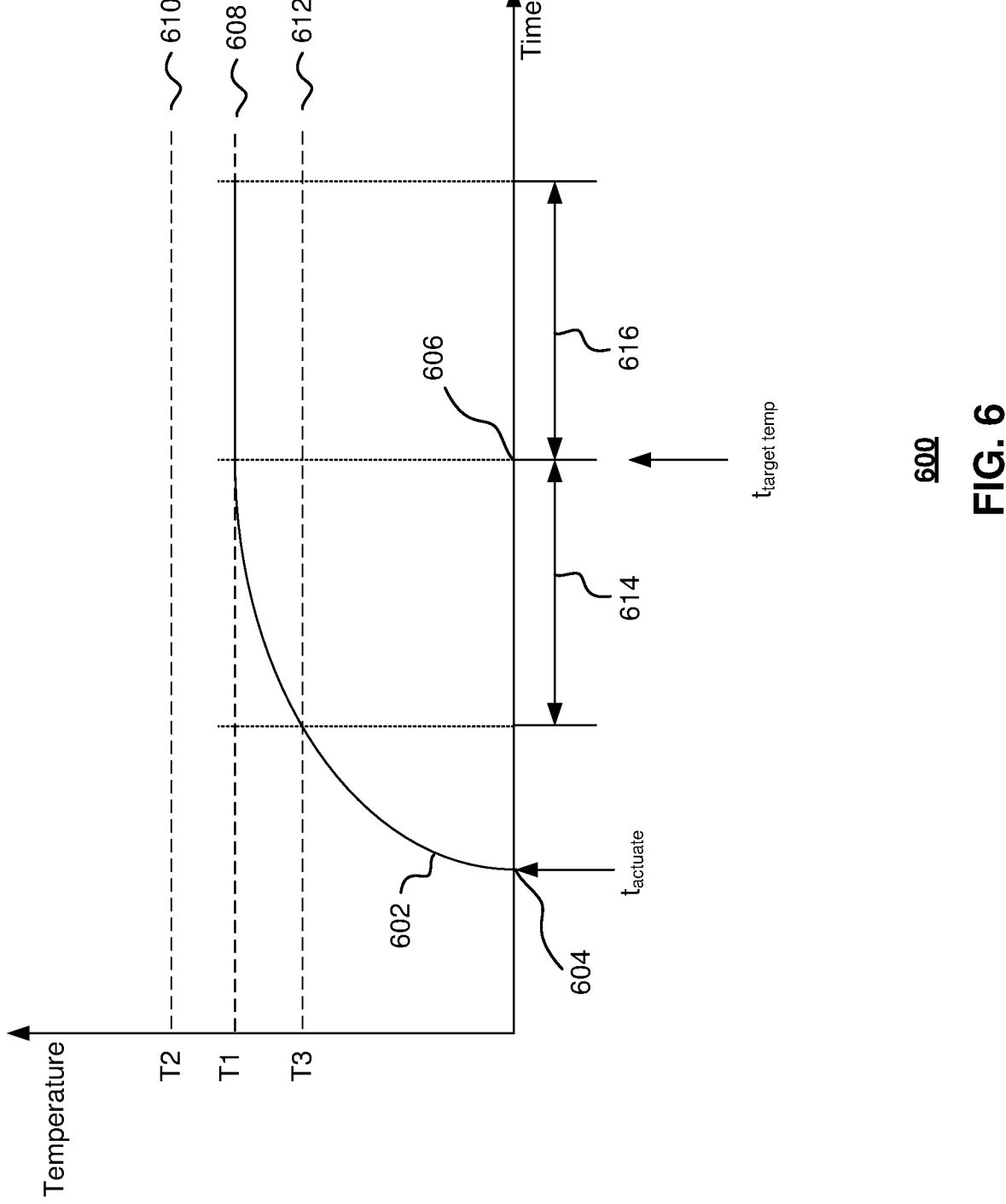
FIG. 6 depicts a temperature profile according to example implementations.

Referring to FIG. 6, there is shown a graph 600 of a variation with time, or build platform position, of the temperature of a wall of the build chamber at a predetermined point corresponding to a respective zone or volume of the build chamber as a consequence of activating one or more than one thermal element associated with that zone or volume. The zone or volume can be any one or more than one of the above-described zones or volumes 220 to 226. The variation in temperature of the wall at the predetermined point, in response to the activated one or more than one thermal element, has a respective rise time or profile 602. Therefore, when the build platform 120 reaches a particular point in time, or a particular position, 604, relative to a forthcoming zone or volume, one or more than one thermal element associated with that forthcoming zone or volume is actuated or otherwise activated to start heating the build material within that upper portion 160 or 536 of the build chamber 110.

A respective period of time later, or at a respective build platform position 606, the build material within the upper portion 160 or 536 of the build chamber 110 will have reached a target temperature (T1) 608. The target temperature 608 can be selected to achieve or meet a predetermined criterion or objective. For example, the target temperature 608 can be selected so that the build material within the upper portion 160 or 536 of the build chamber 110 has a particular relationship with a respective threshold temperature (T2) 610. The respective threshold temperature 610 can be a temperature below which the unfused supply build material 502 in the lower chamber or portion 160 or 538 of the build chamber 110 is not adversely affected. Alternatively, or additionally, the respective threshold temperature 610 can be a temperature to which the unfused supply build material 502 in the lower chamber or portion 160 or 538 can be exposed without degrading, or otherwise adversely affecting, the unfused supply build material. The exposure can be for a particular period of time, or for a particular range of times. For example, the unfused supply build material can have an associated heat capacity threshold below which the unfused supply build material can absorb heat, for a respective period of time, without degrading or being otherwise adversely affected. Reaching that heat capacity threshold will be a function of time and temperature.

For example, the build material 502 within the lower portion 160 or 538 of the build chamber 110 can degrade when exposed to temperatures that exceed a predetermined threshold, or that exceed a further predetermined temperature (T3) 612 for more than a predetermined period of time 614. Example implementations can be realised in which the further predetermined threshold 612 and the predetermined period of time 614 are selected so that the unfused supply build material in the lower portion 160 or 538 of the build chamber 110 is not adversely affected.

Alternatively, or additionally, build material within the lower portion 160 or 538 of the build chamber 110 can encounter flowability issues, that is, assume a state in which the build material within the lower portion 160 or 538 of the build chamber 110 cannot be moved or transported as readily as unfused supply build material under temperatures that do not exceed the predetermined threshold and/or temperature exposure durations at which flowability issues arise. Therefore, at least one, or both, of the above thresholds 610 or 612 can relate to temperatures for mitigating adverse effects of temperature on such flowability.

At least one, or both, of the target temperature 608 or duration 616 under that target temperature can be selected or set according to at least one criterion. Example implementations can be realised in which the at least one criterion is associated with at least one, or both, of dimensional stability or dimensional accuracy. Alternatively, or additionally, example implementations can be realised in which the at least one criterion is associated with at least a mechanical property. For example, the temperature of the fused build material within a respective zone or volume can be selected to realise a predetermined cooling rate of at least one, or both, of the fused or unfused material in the cake, that is, in the upper portion 536 of the build chamber 110. Example implementations can be realised in which the target temperature 608 is selected to maintain the fused build material at or above a respective crystalisation temperature of that fused build material for a predetermined period of time.

Example implementations can be realised in which the target temperature is associated with a type of build material used. For example, a given type of build material, such as, for example, PA11, may have a respective target temperature such as, for example, 185 C or some other target temperature. Another, different, type of build material, such as, for example, PA12 may have a different target temperature such as, for example, 150 C or some other target temperature.

Example implementations can have the effect of more closely managing at least one, or both, of the thermal conditions and power consumption within the printer 100. For example, heating just those zones or volumes containing fused build material, that is, portions of the 3D object under construction, reduces power consumption because power is not expended heating unfused supply build material disposed within the lower portion 162 or 538 of the build chamber 110. Alternatively, or additionally, by activating selected the thermal elements in zones or volumes of interest, thermally induced stresses in mechanical parts of the printer 100 can be reduced.

Figure 7:
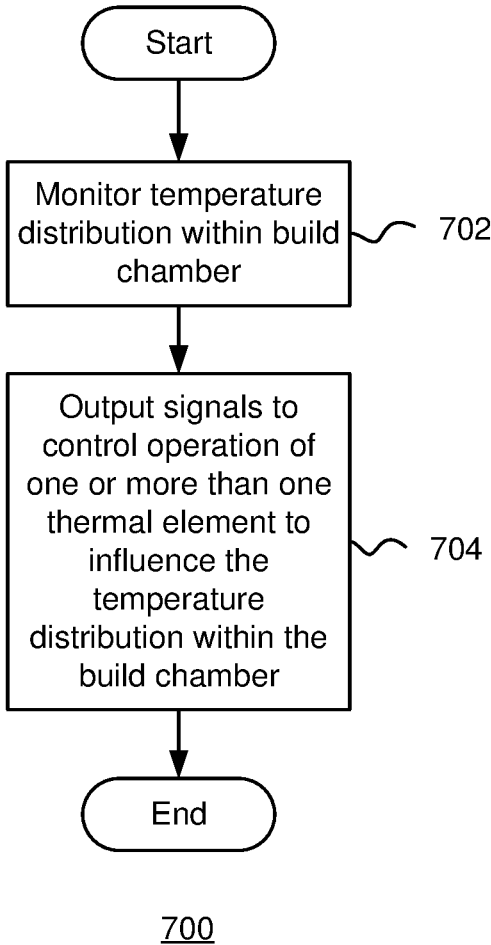
FIG. 7 illustrates a flowchart according to example implementations.

Referring to FIG. 7, there is shown a flowchart 700 for controlling at least one predetermined characteristic of the build chamber 110 or 202 according to example implementations. In an example implementation, the predetermined characteristic is temperature. At 702, a temperature within the build chamber 110 or 202 is sensed by one or more than one sensor. The one or more than one sensor can be any one or more of the sensors described herein such as, for example, sensors 310 and 312. At 704, one or more than one thermal element is controlled or otherwise operated to influence the temperature within the build chamber 110 or 202. The processing and control represented in the flowchart 700 can be implemented via machine executable instructions for execution by at least one processor. The at least one processor can comprise the controller 314 or some other processor or controller such as, for example, the above-described controller 156.

Figure 8:
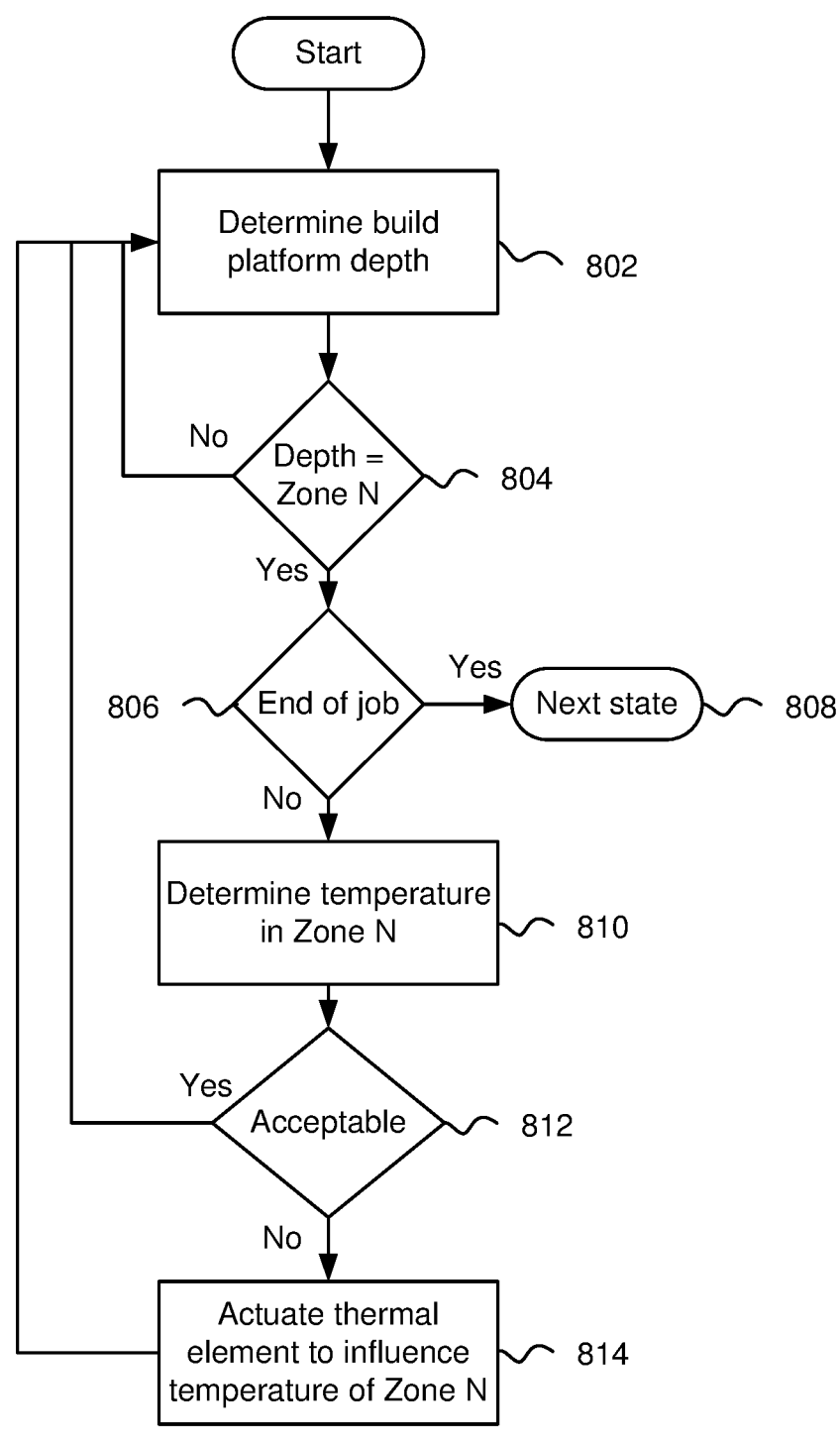
FIG. 8 depicts a flowchart according to example implementations.

Referring to FIG. 8, there is shown a flowchart 800 for controlling at least the temperature within the build chamber 110 or 202 according to example implementations. At 802, the depth of the build platform 120 or 230 is determined. A determination is made at 804 regarding the position of the build platform within a current zone or volume, or whether or not the build platform is within a predetermined time in advance of entering a forthcoming zone or volume or at a predetermined position relative to a forthcoming zone or volume, or whether or not the build platform has entered a specific zone. If the determination at 804 is positive, a determination is made, at 806, regarding whether or not a current print job has finished. If the determination at 806 is positive, printing terminates and controlling the temperature within the build chamber enters a next state or stage at 808. The next state or stage can implement, for example, a progressive or controlled cool down that aims to control or reduce the temperature of the 3D printed object in a predetermined manner. Alternatively, or additionally, the next state or stage can comprise terminating the print job.

However, if the determination at 806 is negative, the current temperature within the current zone within which the build platform 120 resides is determined at 810. It is determined, at 812, whether or not the current temperature is acceptable. If the determination at 812 is positive, control returns to 802. However, if the determination at 812 is negative, one or more than one thermal element associated with the current zone within which the build platform 120 resides, or associated with a forthcoming zone or volume, is actuated to influence the temperature within the current zone or that forthcoming zone or volume. Thereafter, control returns to 802.

Figure 9:
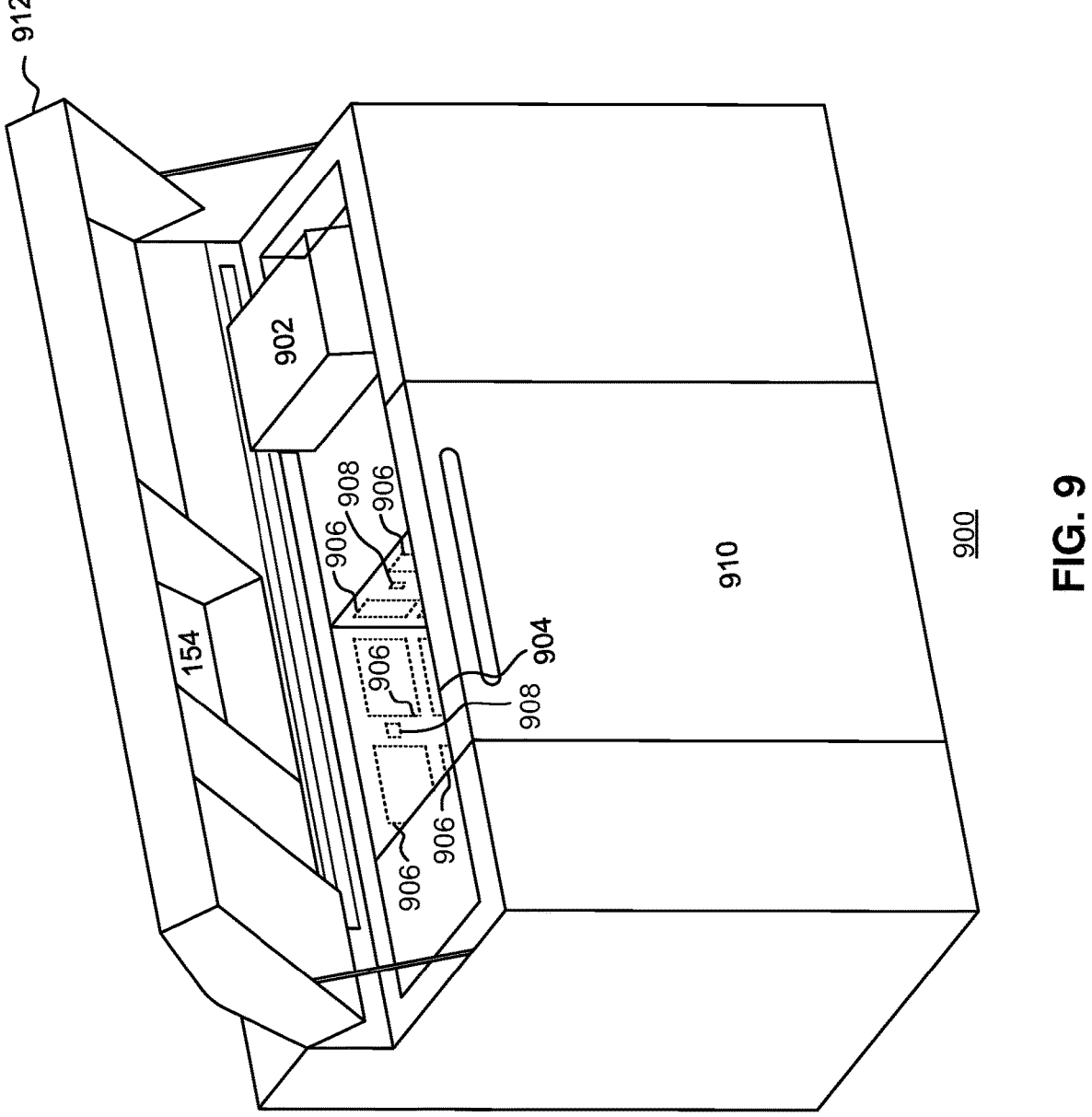
FIG. 9 shows a schematic view of the 3D printing system according to example implementations.

Referring to FIG. 9, there is shown a view of a 3D printer 900. The printer 900 is an example of the above-described printer 100. The printer 900 comprises a printer carriage 902 and a build chamber 904. The build chamber 904 is an example of the above described build chambers 110 and 202. The build chamber 904 comprises a plurality of thermal elements 906. The build chamber 904 also comprises a number of sensors 908 associated with the thermal elements. The build chamber 904 can form part of a removable build unit 910. The build unit 910 is an example of the above described build unit 109. However, alternatively, the build unit 910 can be fixed, that is, it can be an integral part of the printer 900. The printer 900 comprises a lid 912. The lid bears a heater such as the lamp 154 described above with reference to FIG. 1. The printer 900 is operable according to any flowchart, method or technique described herein.

Example implementations of the system 100 can be realised in the form of machine-executable instructions arranged, when executed by a machine, to implement any or all aspects, processes, activities or flowcharts, taken jointly and severally in any and all permutations, described in this application. It will be appreciated that circuitry as used herein can comprise one or more than one of physical electronic circuitry, software, hardware, application specific integrated circuitry or FPGAs, taken jointly or severally in any and all permutations.

Therefore, implementations also provide machine-readable storage storing such machine-executable instructions. The machine-readable storage can comprise transitory or non-transitory machine-readable storage. The machine can comprise one or more processors, or other circuitry, for executing the instructions or implementing the instructions.

Figure 10:
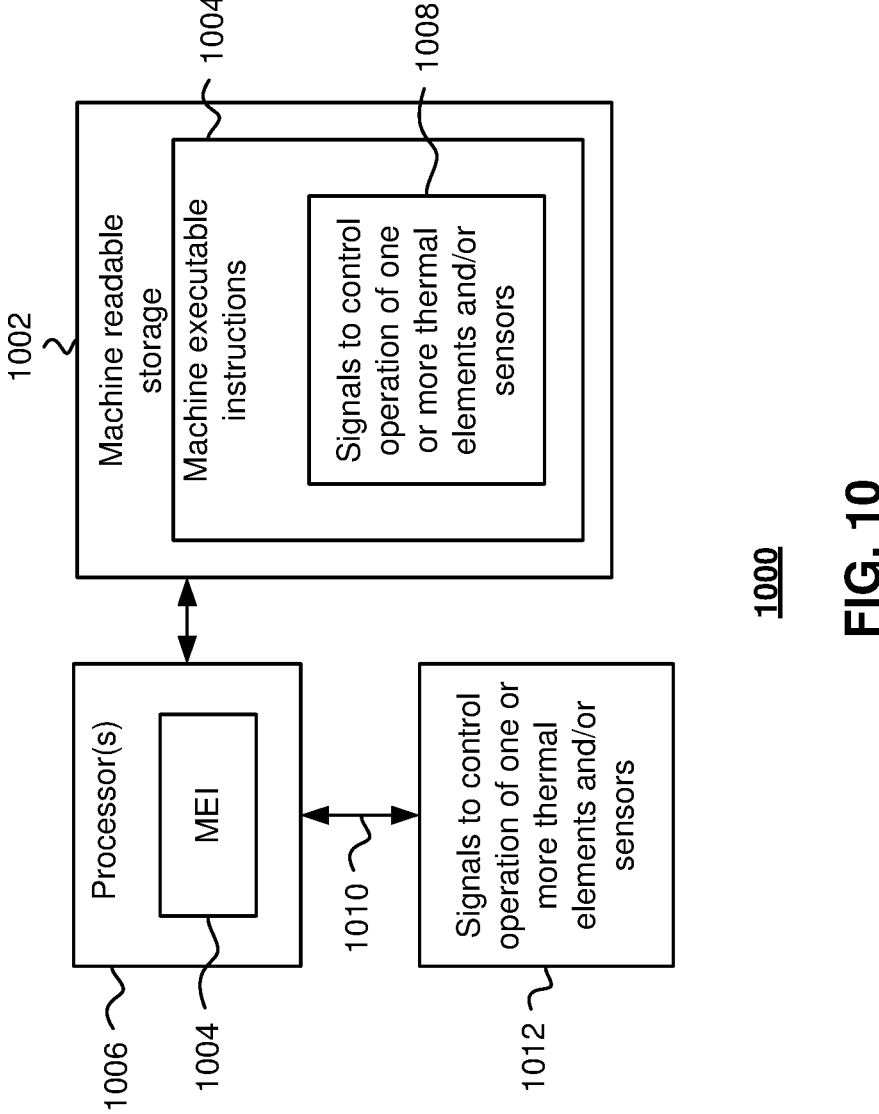
FIG. 10 illustrates machine-readable storage storing machine-executable instructions according to example implementations.

Accordingly, referring to FIG. 10, there is shown a view 1000 of implementations of at least one, or both, of machine-executable instructions or machine-readable storage. FIG. 10 shows machine-readable storage 1002. The machine-readable storage 1002 can be realised using any type of volatile or non-volatile storage such as, for example, memory, a ROM, RAM, EEPROM, or other electrical storage, or magnetic or optical storage or the like. The machine-readable storage 1002 can be transitory or non-transitory. The machine-readable storage 1002 stores machine-executable instructions (MEIs) 1004. The MEIs 1004 comprise instructions that are executable by a processor or other instruction execution, or instruction implementation, circuitry 1006. The processor or other circuitry 1006 is responsive to executing or implementing the MEIs 1004 to perform any and all activities, processes, operations or methods described, illustrated and/or claimed in this application. Example implementations of the MIEs 1004 comprise machine-executable instructions 1008 for controlling at least one, or both, of one or more than one thermal element of the thermal elements described herein or one or more than one sensor described herein.

The controller 156 or 314 can be an implementation of the foregoing processor or other circuitry 1006 for executing any such MEIs 1004.

Further example implementations can be realised according to the following clauses:

Clause 1: An additive manufacturing system for manufacturing a 3D object from a build material; the system comprising a build chamber having a build platform for supporting a build material bed; the build chamber having a number of walls, at least one wall of the plurality of walls bearing, or being associated with, two or more thermal elements, responsive to respective control signals, to influence the temperature of the build chamber; the two or more thermal elements being disposed in a direction of an axis of movement of the build platform.

Clause 2: The system of clause 1, in which a number of walls of the plurality of walls bear, or are associated with, two or more thermal elements, responsive to respective signals, to influence the temperature of the build chamber.

Clause 3: The system of clause 2, in which said number of walls of the plurality of walls comprises at least four walls bearing, or being associated with, two or more thermal elements, responsive to respective control signals, to influence the temperature of the build chamber.

Clause 4: The system of any preceding clause, in which said two or more thermal elements, responsive to respective control signals, to influence the temperature of the build chamber comprise at least one thermal element arranged to influence the temperature of a respective region of the build chamber and at least one further thermal element arranged to influence the temperature of at least one further respective region of the build chamber.

Clause 5: The system of clause 4 in which said at least one thermal element arranged to influence the temperature of a respective region of the build chamber is arranged to establish a respective temperature within said respective region and said at least one further thermal element arranged to influence the temperature of at least one further respective region of the build chamber is arranged to establish a further respective temperature within said further respective region, said respective temperature being at least one of different to said further respective temperature or the same as said further respective temperature.

Clause 6: The system of any preceding clause, in which said two or more thermal elements, responsive to respective signals, to influence the temperature of the build chamber are operable to establish a predetermined or target temperature profile within the build chamber.

Clause 7: The system of clause 6, in which the predetermined or target temperature profile is a substantially uniform temperature throughout the build chamber.

Clause 8: The system of any preceding clause, in which said two or more thermal elements to influence the temperature of the build chamber are responsive to one or more than one temperature sensor for monitoring temperature within the build chamber.

Clause 9: The system of any preceding clause, in which the build platform has at least one respective direction of movement and the two or more thermal elements are arranged relative to one another in said at least one respective direction of movement.

Clause 10: The system of clause 9, in which the two or more thermal elements are at least one of arranged or operable in sets of thermal elements that define respective thermally controlled zones of the build chamber.

Clause 11: The system of any preceding clause, in which the two or more thermal elements, responsive to respective control signals, to influence the temperature of the build chamber are operable to realise a predetermined rate of cooling of the build chamber.

Clause 12: The system of any preceding clause, in which at least one thermal element of the two or more thermal elements is operable to thermally influence the temperature of at least one, or both, of the build material bed or build chamber concurrently with at least one other thermal element of the two or more thermal elements not being operate to influence the temperature of at least one, or both, of the build chamber or unfused supply build material.

Clause 13: Machine-readable storage storing machine-executable instructions arranged, when executed, to control a 3D printer having a build chamber comprising a build platform for supporting a build material bed; the build chamber having a number of walls, at least one wall of the plurality of walls bearing, or being associated with, two or more thermal elements, responsive to respective control signals, to influence the temperature of the build chamber; wherein the build platform has at least one respective direction of movement and the two or more thermal elements are arranged relative to one another in said at least one respective direction of movement; the machine-executable instructions comprising: instructions for controlling said respective control signals to said two or more thermal elements to influence the temperature of the build chamber.

Cause 14: Machine readable storage of clause 13, storing the machine-executable instructions for controlling said respective control signals to said two or more thermal elements to influence the temperature of the build chamber in response to at least one of build platform position or build chamber temperature.

Although example implementations have been described with reference to the unfused supply build material being stored within the lower portion of the build chamber beneath the build platform, example implementations are not limited to such arrangements. Example implementations can be realised in which the unfused supply build material is stored within a hopper. The hopper can be separate from the build chamber as opposed to being an integral part of the build chamber.

The invention claimed is:

1. An additive manufacturing system comprising:
a build platform to support a build material bed and that is to vertically descend as an object is additively manufactured on a layer-by-layer basis from build material of the build material bed;
a plurality of vertical walls defining a build chamber that includes the build platform and that is divided by the build platform into an upper portion including the build material bed and a lower portion below the upper portion;

an unfused supply of the build material stored in the lower portion of the build chamber;

at least one channel to deliver the build material from the unfused supply from the lower portion of the build chamber to the upper portion of the build chamber to additively manufacture a next layer of the object after a current layer of the object has been additively manufactured;

a plurality of thermal elements associated with at least one of the vertical walls, vertically disposed within the build chamber, and dividing the build chamber into a plurality of vertical zones from a top zone to a bottom zone;

a plurality of temperature sensors respectively associated with the vertical zones, each temperature sensor to detect a temperature of the build material in the vertical zone with which the temperature sensor is associated;

a processor; and a memory storing program code that is configured such that when executed by the processor, the program code causes the processor to perform processing comprising, as the object is additively manufactured on the layer-by-layer basis from the build material:

as the build platform enters each vertical zone as the build platform descends, activating the thermal elements within the vertical zone and controlling the thermal elements to control the temperature of the build material in the upper portion of the build chamber relative to at least one threshold associated with the temperature of the build material in the lower portion of the build chamber.

2. The additive manufacturing system of claim 1, wherein the thermal elements are associated with at least two of the vertical walls.

3. The additive manufacturing system of claim 2, wherein the at least one of the vertical walls with which the thermal elements are associated bears the thermal elements.

4. The additive manufacturing system of claim 1, wherein the at least one threshold comprises at least a first threshold temperature below which the build material in the lower portion is not adversely affected, such that the temperature of the build material in the upper portion is maintained below the first threshold temperature.

5. The additive manufacturing system of claim 1, wherein the at least one threshold comprises at least a second threshold temperature above which the build material in the lower portion is not adversely affected for at least a duration of time, such that the temperature of the build material in the upper portion is maintained above the second threshold temperature for no more than the duration of time.

6. The additive manufacturing system of claim 1, wherein the at least one threshold comprises both:

a first threshold temperature below which the build material in the lower portion is not adversely affected, such that the temperature of the build material in the upper portion is maintained below the first threshold temperature; and a second threshold temperature above which the build material in the lower portion is not adversely affected for at least a duration of time, such that the temperature of the build material in the upper portion is maintained above the second threshold temperature for no more than the duration of time.

7. The additive manufacturing system of claim 1, further comprising:

a first reservoir of fusing agent; and a first inkjet pen to selectively dispense the fusing agent on the build material bed in accordance with the current layer of the object being additively manufactured.

8. The additive manufacturing system of claim 7, further comprising:

a second reservoir of detailing agent; and a second inkjet pen to selectively dispense the detailing agent on the build material bed in accordance with the current layer of the object being additively manufactured.

9. The additive manufacturing system of claim 7, further comprising:

a printhead carriage on which the first inkjet pen is disposed to scan over the build material bed such that the first inkjet pen is to selectively dispense the fusing agent as the printhead carriage scans over the build material bed.

10. The additive manufacturing system of claim 9, further comprising:

an energy source disposed over the build material bed to apply energy to the build material bed after the fusing agent has been selectively dispensed on the build material bed, to selectively fuse the build material to solidify the current layer of the object.

11. The additive manufacturing system of claim 10, further comprising:

a recoater in the upper portion of the build chamber to deposit a layer of the build material on the build material bed delivered by the at least one channel from the unfused supply.

12. The additive manufacturing system of claim 11, wherein the processing further comprises causing the object to be additively manufactured on the layer-by-layer basis by, for each of a plurality of layers of the object:

controlling the recoater to deposit the layer of the build material on the build material bed;

controlling the printhead carriage to scan over the build material bed;

controlling the first inkjet pen to selectively dispense the fusing agent on the build material bed in accordance with the current layer of the object being formed, as the printhead carriage scans over the build material bed; and controlling the energy source to apply the energy to the build material bed to selectively fuse the build material to solidify the current layer of the object.

13. The additive manufacturing system of claim 12, further comprising:

at least one Archimedes screw to which the build platform is attached to cause the build platform to vertically descend.

14. The additive manufacturing system of claim 13, wherein the processing further comprises causing the object to be additively manufactured on the layer-by-layer basis by further, for each of the plurality of layers of the object:

controlling the at least one Archimedes screw to cause the build platform to vertically descent by a build material layer height.

15. A non-transitory machine-readable medium storing program code that is configured such that when executed a processor of an additive manufacturing system, causes the processor to perform processing, wherein the additive manufacturing system includes:

a build platform to support a build material bed and that is to vertically descend as an object is additively manufactured on a layer-by-layer basis from build material;

a plurality of vertical walls defining a build chamber that includes the build platform and that is divided by the build platform into an upper portion including the build material bed and a lower portion below the upper portion;

an unfused supply of the build material stored in the lower portion of the build chamber;

at least one channel to deliver the build material from the unfused supply from the lower portion of the build chamber to the upper portion of the build chamber to additively manufacture a next layer of the object after a current layer of the object has been additively manufactured;

a plurality of thermal elements associated with at least one of the vertical walls, vertically disposed within the build chamber, and dividing the build chamber into a plurality of vertical zones from a top zone to a bottom zone; and a plurality of temperature sensors respectively associated with the vertical zones, each temperature sensor to detect a temperature of the build material in the vertical zone with which the temperature sensor is associated, and wherein the processing comprises, as the object is additively manufactured on the layer-by-layer basis from the build material:

as the build platform enters each vertical zone as the build platform descends, activating the thermal elements within the vertical zone and controlling the thermal elements to control the temperature of the build material in the upper portion of the build chamber relative to at least one threshold associated with the temperature of the build material in the lower portion of the build chamber.

16. The non-transitory machine-readable medium of claim 15, wherein the at least one threshold comprises at least a first threshold temperature below which the build material in the lower portion is not adversely affected, such that the temperature of the build material in the upper portion is maintained below the first threshold temperature.

17. The non-transitory machine-readable medium of claim 15, wherein the at least one threshold comprises at least a second threshold temperature above which the build material in the lower portion is not adversely affected for at least a duration of time, such that the temperature of the build material in the upper portion is maintained above the second threshold temperature for no more than the duration of time.

18. The non-transitory machine-readable medium of claim 15, wherein the at least one threshold comprises both:

a first threshold temperature below which the build material in the lower portion is not adversely affected, such that the temperature of the build material in the upper portion is maintained below the first threshold temperature; and a second threshold temperature above which the build material in the lower portion is not adversely affected for at least a duration of time, such that the temperature of the build material in the upper portion is maintained above the second threshold temperature for no more than the duration of time.

19. The non-transitory machine-readable medium of claim 15, wherein the additive manufacturing system further includes:

a first reservoir of fusing agent;

a first inkjet pen to selectively dispense the fusing agent on the build material bed in accordance with the current layer of the object being additively manufactured;

a printhead carriage on which the first inkjet pen is disposed to scan over the build material bed such that the first inkjet pen is to selectively dispense the fusing agent as the printhead carriage scans over the build material bed;

an energy source disposed over the build material bed to apply energy to the build material bed after the fusing agent has been selectively dispensed on the build material bed, to selectively fuse the build material to solidify the current layer of the object; and a recoater in the upper portion of the build chamber to deposit a layer of the build material on the build material bed delivered by the at least one channel from the unfused supply, and wherein the processing further comprises causing the object to be additively manufactured on the layer-by-layer basis by, for each of a plurality of layers of the object:

controlling the recoater to deposit the layer of the build material on the build material bed;

controlling the printhead carriage to scan over the build material bed;

controlling the first inkjet pen to selectively dispense the fusing agent on the build material bed in accordance with the current layer of the object being formed, as the printhead carriage scans over the build material bed; and controlling the energy source to apply the energy to the build material bed to selectively fuse the build material to solidify the current layer of the object.

20. The non-transitory machine-readable medium of claim 19, wherein the additive manufacturing system further includes:

at least one Archimedes screw to which the build platform is attached to cause the build platform to vertically descend, and wherein the processing further comprises causing the object to be additively manufactured on the layer-by-layer basis by further, for each of the plurality of layers of the object:

controlling the at least one Archimedes screw to cause the build platform to vertically descent by a build material layer height.

* * * * *